(12) United States Patent
Cook

(10) Patent No.: US 9,354,116 B1
(45) Date of Patent: May 31, 2016

(54) OPTICAL FORMS FOR MULTI-CHANNEL DOUBLE-PASS DISPERSIVE SPECTROMETERS

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/689,229

(22) Filed: Apr. 17, 2015

(51) Int. Cl.
G01J 3/00 (2006.01)
G01J 3/28 (2006.01)
G01J 3/18 (2006.01)
G01J 3/02 (2006.01)

(52) U.S. Cl.
CPC ............. G01J 3/2823 (2013.01); G01J 3/0294 (2013.01); G01J 3/18 (2013.01)

(58) Field of Classification Search
CPC ...................................... G01J 3/00; G01J 3/18
USPC .......................................................... 356/51
See application file for complete search history.

(56) References Cited

U.S. PATENT DOCUMENTS

| | | | |
|---|---|---|---|
| 4,733,955 A | 3/1988 | Cook | |
| 5,260,767 A | 11/1993 | Cook | |
| 5,550,672 A | 8/1996 | Cook | |
| 6,902,282 B2 | 6/2005 | Cook | |
| 7,382,498 B1 | 6/2008 | Cook | |
| 8,436,992 B2 * | 5/2013 | Robinson | G01J 3/0256 356/328 |
| 8,507,866 B2 | 8/2013 | Cook | |
| 2009/0009897 A1 | 1/2009 | Holota et al. | |

FOREIGN PATENT DOCUMENTS

CA 2647405 A1 6/2009

* cited by examiner

*Primary Examiner* — Roy M Punnoose
(74) *Attorney, Agent, or Firm* — Lando & Anastasi, LLP

(57) ABSTRACT

A multi-channel double-pass imaging spectrometer based on a reimaging or relayed all-reflective optical form, such as a four-mirror anastigmat (4MA) or five-mirror anastigmat (5MA). In one example, such a spectrometer includes a slit through which incident electromagnetic radiation enters the spectrometer, an imaging detector positioned at an image plane of the spectrometer co-located with the slit, and double-pass all-reflective reimaging optics configured to receive the electromagnetic radiation from the slit and to output a collimated beam of the electromagnetic radiation, and further configured to produce a reimaged pupil positioned between the double-pass all-reflective reimaging optics and the image plane. The spectrometer further includes at least one dispersive element configured to spectrally disperse the infrared electromagnetic radiation in each channel and being oriented to direct the dispersed output through the double-pass all-reflective reimaging optics to the image plane.

18 Claims, 7 Drawing Sheets

OPTICAL FORMS FOR MULTI-CHANNEL DOUBLE-PASS DISPERSIVE SPECTROMETERS

BACKGROUND

Typically, an imaging spectrometer is composed of an objective or imaging optical module, which forms a scene image at a slit, and a spectral optical module, which receives and collimates the line field of view from the objective, disperses or separates the radiation as a function of wavelength, and images it onto a two dimensional detector array. A double pass technique is sometimes used in the spectral optics. For example, U.S. Pat. No. 5,260,767 discloses the use of the non-relayed reflective triplet optical form as a double-pass, single-channel dispersive spectrometer. For another example, U.S. Pat. No. 7,382,498 discloses the use of the non-relayed reflective triplet optical form as a double-pass, dual-channel dispersive spectrometer. As the reflective triplet optical form is non-reimaging (non-relayed), when used for infrared applications, the entire spectrometer optical train must be cooled, generally inside a cryo-vac housing. This requirement results in a cool-down time measuring several hours, which may severely limit the use of the instrument in certain applications or environments.

SUMMARY OF INVENTION

Aspects and embodiments are directed to the use of a reimaging or relayed all-reflective optical form, including a four-mirror anastigmat (4MA) or five-mirror anastigmat (5MA), in double-pass dispersive spectrometers. For infrared applications, the relayed nature of the 4MA or 5MA allows for removal of the optics from the cooling chamber (e.g., cryo-vac housing), resulting in an ability to use a much smaller chamber that houses only the slit(s) and imaging detectors/sensors, such as a tactical-style Dewar, for example, and greatly reduced cool-down times. For example, cool-down times on the order of a few minutes may be achieved. Additionally, the all-reflective 4MA or 5MA optical forms may preserve all the benefits of the conventional reflective triplet (such as little to no spectral limitations and multi-channel capability), while accommodating larger format imaging detectors and providing fast optical speeds, as discussed further below.

According to one embodiment, a multi-channel double-pass imaging spectrometer comprises at least one slit through which incident electromagnetic radiation enters the spectrometer, at least one imaging detector positioned at an image plane of the spectrometer, the image plane being co-located with the at least one slit, double-pass all-reflective reimaging optics configured to receive the electromagnetic radiation from the at least one slit and to output a collimated beam of the electromagnetic radiation, and further configured to produce a reimaged pupil positioned between the double-pass all-reflective reimaging optics and the image plane, a beamsplitter configured to split the collimated beam of the electromagnetic radiation into a first spectral band and a second spectral band, a first dispersive element configured to spectrally disperse the first spectral band of the electromagnetic radiation to provide a first dispersed output, the first dispersive element being oriented to direct the first dispersed output through the double-pass all-reflective reimaging optics to the image plane, and a second dispersive element configured to spectrally disperse the second spectral band of the electromagnetic radiation to provide a second dispersed output, the second dispersive element being oriented to direct the second dispersed output through the double-pass all-reflective reimaging optics to the image plane.

In one example the multi-channel double-pass imaging spectrometer further comprises a cooling chamber positioned between the reimaged pupil and the at least one slit, the at least one imaging detector being located within the cooling chamber.

In one example the double-pass all-reflective reimaging optics includes a four-mirror anastigmat. The four-mirror anastigmat may include, for example, a primary mirror having a positive optical power, a secondary mirror, a tertiary mirror having a negative optical power, and a quaternary mirror having a positive optical power. In one example the secondary mirror is non-powered. In another example a sum of the optical powers of the primary, secondary, tertiary, and quaternary mirrors is zero.

In another example the double-pass all-reflective reimaging optics includes a five-mirror anastigmat. The five-mirror anastigmat may include, for example, a first mirror having a positive optical power, a second mirror having a negative optical power, a third mirror having a positive optical power, a fourth mirror having a negative optical power, and a fifth mirror having a positive optical power. In one example a sum of the optical powers of the first, second, third, fourth, and fifth mirrors is zero.

In one example the first and second dispersive elements are prisms. In another example the first and second dispersive elements are diffraction gratings.

The at least one imaging detector may include a focal plane array sensor, for example.

The double-pass all-reflective reimaging optics may further include a real entrance pupil, and be configured to output the collimated beam of the electromagnetic radiation at the real entrance pupil. In one example the first and second dispersive elements are located proximate the real entrance pupil.

According to another embodiment, a double-pass infrared imaging spectrometer comprises at least one slit through which incident infrared electromagnetic radiation enters the spectrometer, at least one imaging detector positioned at an image plane of the spectrometer, the image plane being co-located with the at least one slit, double-pass all-reflective reimaging optics configured to receive the infrared electromagnetic radiation from the at least one slit and to output a collimated beam of the infrared electromagnetic radiation at a real entrance pupil, and further configured to produce a reimaged pupil positioned between the double-pass all-reflective reimaging optics and the image plane, at least one dispersive element positioned proximate the real entrance pupil and configured to spectrally disperse the infrared electromagnetic radiation to provide a dispersed output, the dispersive element being oriented to direct the dispersed output through the double-pass all-reflective reimaging optics to the image plane, and a cooling chamber positioned between the reimaged pupil and the at least one slit, the at least one imaging detector being positioned within the cooling chamber, and the double-pass all-reflective reimaging optics being positioned outside the cooling chamber.

In one example the double-pass all-reflective reimaging optics includes a four-mirror anastigmat. In another example the double-pass all-reflective reimaging optics includes a five-mirror anastigmat.

The double-pass infrared imaging spectrometer may be a dual-channel spectrometer, for example. In one such example, the dual-channel double-pass infrared imaging spectrometer may further comprise a beamsplitter configured to separate the collimated beam of the infrared electromagnetic radiation into a first spectral band and a second spectral band. The at least one dispersive element may include a first dispersive element configured to spectrally disperse the first spectral band of the electromagnetic radiation to provide a first dispersed output, the first dispersive element being oriented to direct the first dispersed output through the double-pass all-reflective reimaging optics to the image plane, and a second dispersive element configured to spectrally disperse the second spectral band of the electromagnetic radiation to provide a second dispersed output, the second dispersive element being oriented to direct the second dispersed output through the double-pass all-reflective reimaging optics to the image plane.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1A:
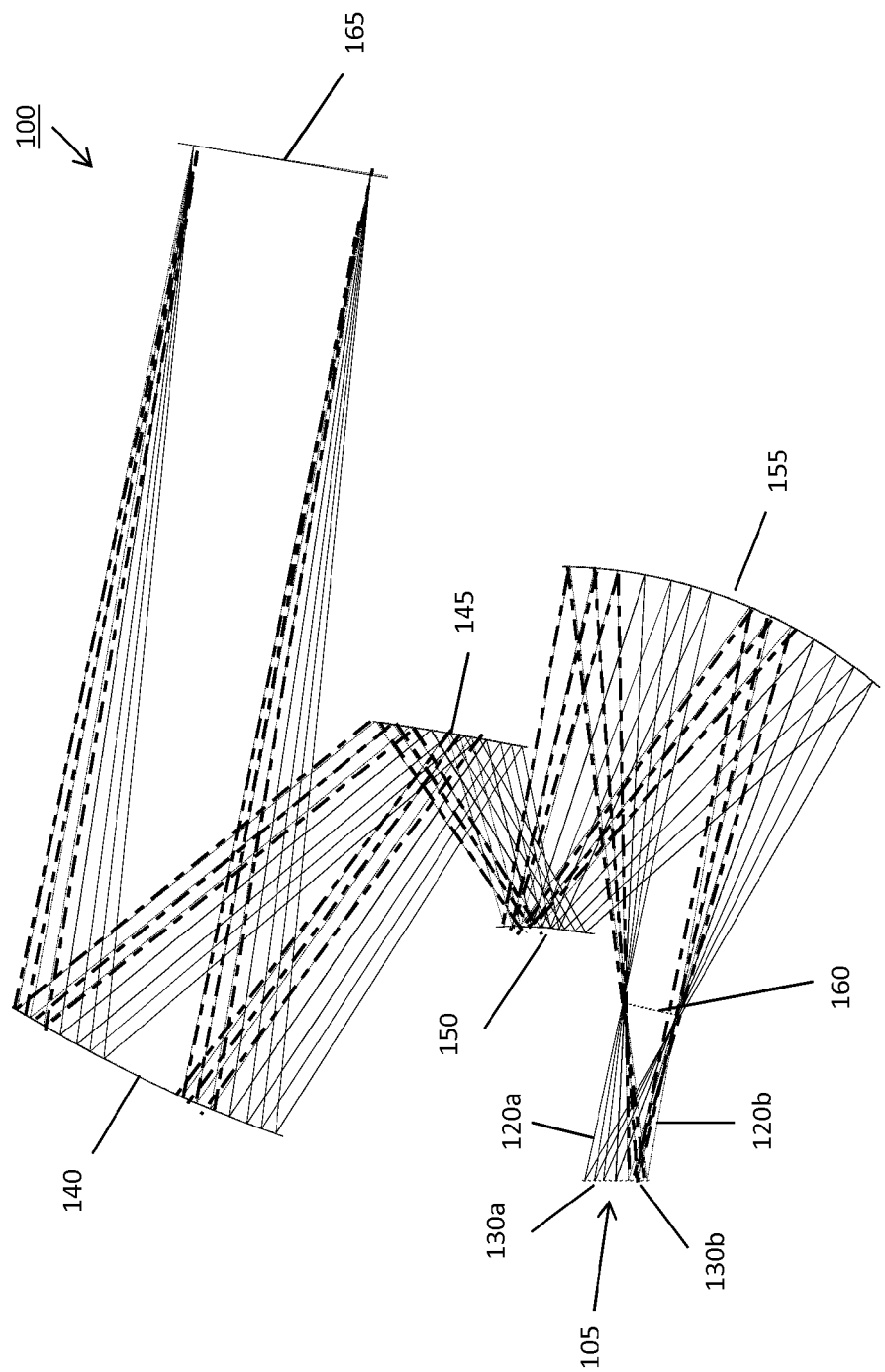
FIG. 1A is a ray trace section of one example of a dual-channel double-pass spectrometer in the tangential plane using the four-mirror anastigmat optical form according to aspects of the present invention.

Aspects and embodiments are directed to the use of relayed optical form, such as a four-mirror anastigmat (4MA) or five-mirror anastigmat (5MA) in double-pass, multi-channel, dispersive imaging spectrometers. The 4MA or 5MA optical forms disclosed and used herein are all-reflective and flat-field, and provide a real entrance pupil, as discussed further below. U.S. Pat. No. 5,550,672 discloses examples of the structural and functional characteristics of the 4MA optical form in detail. Similarly, U.S. Pat. No. 6,902,282 discloses examples of the structural and functional characteristics of the 5MA optical form in detail. The relayed nature of the 4MA and 5MA optical forms provides the advantage of allowing for ambient optics for infrared applications; a significant benefit over conventional non-reimaging optical forms, such as the reflective triplet. In addition, as discussed further below, the additional mirrors included in the 4MA and 5MA optical forms relative to the reflective triplet may accommodate larger format slit(s) and FPA(s) configurations and faster optical speeds.

U.S. Pat. No. 8,507,866 discloses an infrared spectrometer having ambient optics; however that configuration has spectral limitations and may not be suited to multi-channel operation. Additionally, the use of a "narcissus mirror" slit substrate, as disclosed in U.S. Pat. No. 8,507,866 may pose difficulties for spectrometers with large formats. Embodiments of the spectrometers disclosed herein using the 4MA or 5MA optical forms may avoid such disadvantages and retain the benefits associated with the conventional reflective triplet optical form, while providing additional capability, as discussed in more detail below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1B:
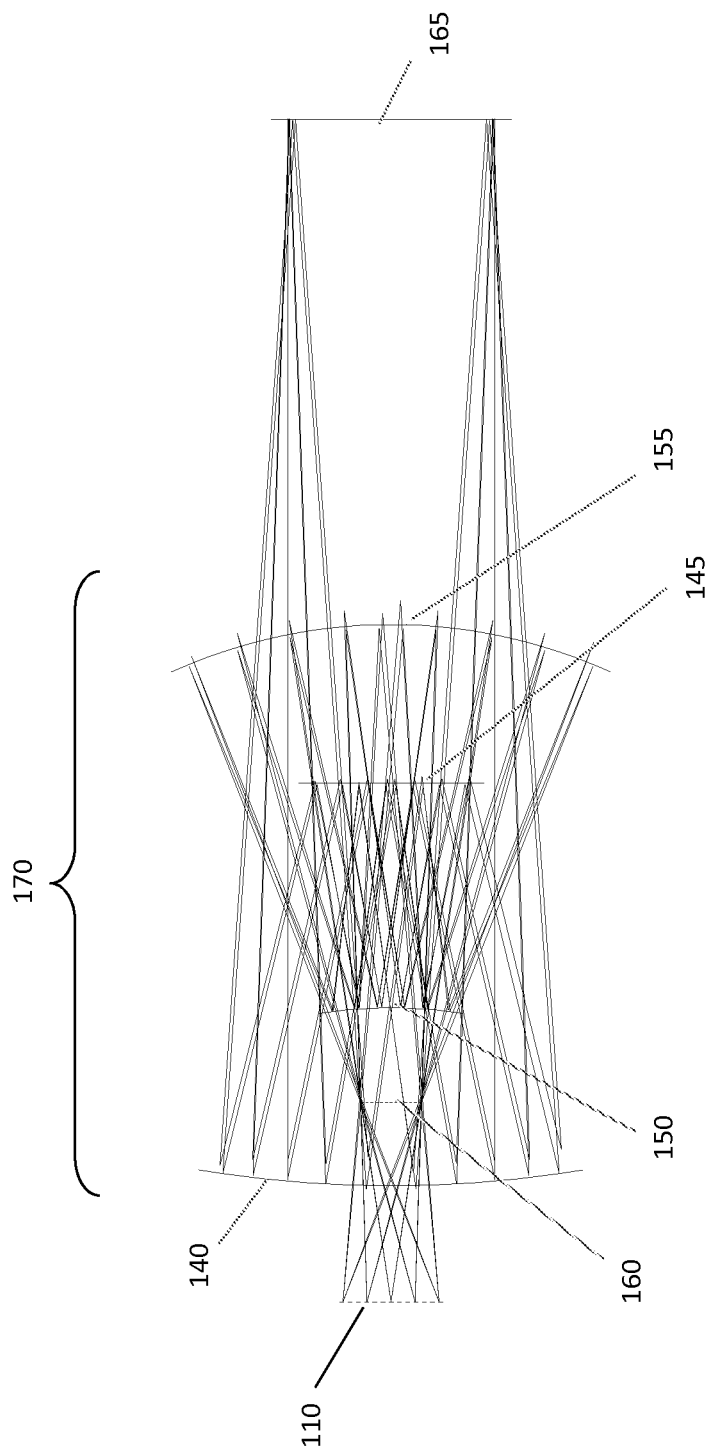
FIG. 1B is a plan view of the ray trace of FIG. 1A.

As discussed above, according to one embodiment, a multi-channel dispersive imaging spectrometer is implemented using an all-reflective 4MA optical form. Referring to FIGS. 1A and 1B, there is illustrated an example of a dual-channel double-pass spectrometer using the all-reflective 4MA optical form. In the illustrated example, the spectrometer 100 is dual-channel in the tangential plane; however those skilled in the art will readily appreciate that the spectrometer could alternatively be dual-channel in the sagittal plane. Electromagnetic radiation from a viewed scene is input to the spectrometer, as indicated by arrow 105, via a slit 110. In the illustrated example, the spectrometer 100 is a dual-channel spectrometer, and accordingly, the electromagnetic radiation may be split into a first spectral band (channel) 120a and a second spectral band 120b. Two imaging sensors or detectors 130a and 130b, one for each spectral channel, may be located at a common image plane substantially co-located with the slit 110.

Figure 2:
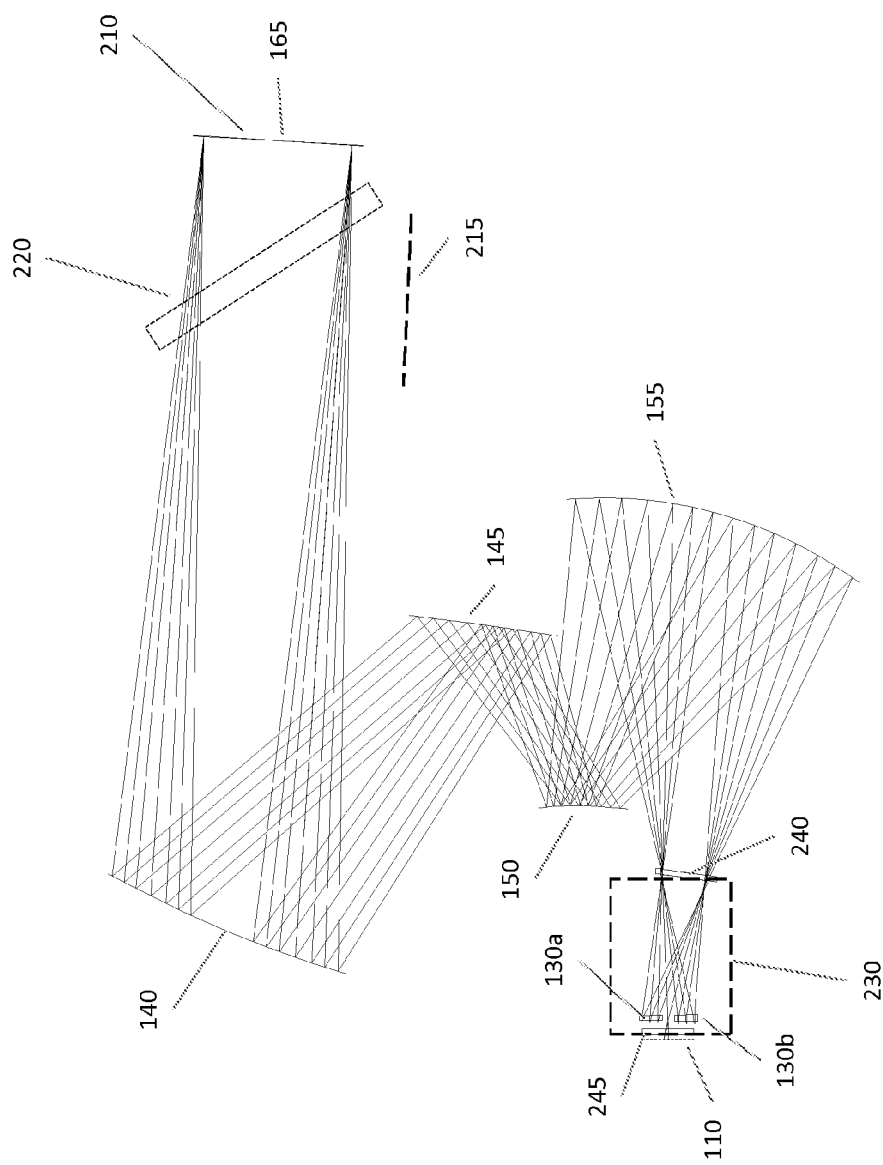
FIG. 2 is a ray trace section of one of example of the spectrometer of FIGS. 1A and 1B according to aspects of the present invention.

In the illustrated example, the spectrometer optics includes a 4MA 170 comprised of a primary mirror 140, a secondary mirror 145, a tertiary mirror 150, and a quaternary mirror 155, arranged in a double-pass configuration and forming a reimaged pupil at 160. The spectrometer 100 further includes a real entrance pupil 165 at which a pair of reflective dispersive elements, one for each spectral channel, may be placed and which spectrally disperse the electromagnetic radiation and reflect the dispersed radiation back through the 4MA 170 to the imaging detectors 130a, 130b. FIG. 2 illustrates an example of the spectrometer 100 showing first and second dispersive elements 210 and 215, respectively, along with a beamsplitter 220 configured to split the electromagnetic radiation into the two spectral bands 120a, 120b and direct each spectral band to the respective dispersive element. The dispersive elements 210, 215 may be diffraction gratings or prisms, for example. Referring again to FIGS. 1A and 1B, the electromagnetic radiation 120a, 120b enters the spectrometer system via the slit 110 and the mirrors of the 4MA 170 cooperate to collimate the incident radiation to the real entrance pupil 165 and dispersive elements 210 and 215, and back to the imaging detectors 130a, 103b adjacent to the slit 110. The 4MA 170 is thus termed double-pass because the electromagnetic radiation is collimated on the way to the dispersive elements 210, 215 and returns through the 4MA to be imaged on the common image plane where the imaging detectors 130a, 103b are located.

In one example the imaging detectors 130a, 130b are focal plane array (FPA) imaging sensors. In the illustrated example, the spectrometer 100 includes two imaging sensors 130a, 130b, one for each of the two spectral channels; however, in other examples, a single dual-band FPA or other imaging sensor may be used.

According to one embodiment, the power distribution of the primary mirror 140, tertiary mirror 150, and quaternary mirror 155 is positive, negative, and positive, respectively. The secondary mirror 145 is preferably non-powered, but could have a slight positive or negative power, and it may have a higher-order aspheric figure. The precise powers of the mirrors 140, 145, 150, and 155 may be selected such that the sum of the powers is zero. A zero sum provides correction of the Petzval sum, causing a zero curvature in the focal plane (i.e., a substantially flat field condition). The cross-section of the primary mirror 140 may be conic (e.g., paraboloid, hyperboloid or ellipsoid) or a higher-order aspheric. The cross-section of the tertiary mirror 150 may be hyperboloid, but can also be a higher-order aspheric. The cross-section of the quaternary mirror 155 may be ellipsoid, but can also be a higher-order aspheric. The secondary mirror 145, though nominally flat, may generally be provided with an aspheric surface. The aspheric surface also allows the secondary mirror 145 to reduce aberrations in the pupil imagery. The geometries of the mirrors may be selected at the discretion of the optical designer. Composition of the mirrors 140, 145, 150, and 155 is dependent upon the application for which the spectrometer 100 is intended. For example, for infrared applications, the mirrors 140, 145, 150, and 155 can be made of materials such as glass, plastic, metal, or advanced composite materials. The method of fabricating the mirrors 140, 145, 150, and 155 may be dependent upon the composition. Fabrication processes may include conventional polishing, computer-controlled polishing, precision machining, replication, and molding, for example.

The 4MA 170 provides compact, reimaging, all-reflective optics configured to image a wide field of view onto a flat field, thus being well suited for multi-channel spectrometer applications. In addition, the relayed nature of the 4MA 170, with its associated reimaged pupil 160, allows for location of the slit(s) 110 and the imaging sensors 130a, 130b inside a cooling chamber, while the optical train can remain at ambient temperature. For example, referring to FIG. 2, a relatively small cooling chamber 230 (or cavity) which houses the imaging detectors 130a, 130b may be positioned between the reimaged pupil 160 and the slit(s) 110. The chamber 230 may be a tactical Dewar or other type of cryo-vac chamber, for example. The chamber 230 may include a first window 245 and a second window 240 that are transparent to the electromagnetic radiation 120a, 120b to allow the electromagnetic radiation to enter and leave the chamber. In one example, the first window 245 may be positioned prior to but substantially close to the slit(s) 110, and the second window 240 may be positioned after but substantially close to the reimaged pupil 160. The mirrors 140, 145, 150, and 155, along with the dispersive elements 210, 215 and the beamsplitter 220 are located outside of the cooling chamber 230 and are therefore at ambient temperature. The electromagnetic radiation from the slit(s) 110 to the dispersive elements 210, 215 and back to the imaging detectors 130a, 130b may be entirely confined to the ambient low emissivity mirror surfaces of the 4MA, and thus the imaging detectors 130a, 130b "see" a minimum of thermally emitted background radiation.

Figure 3:
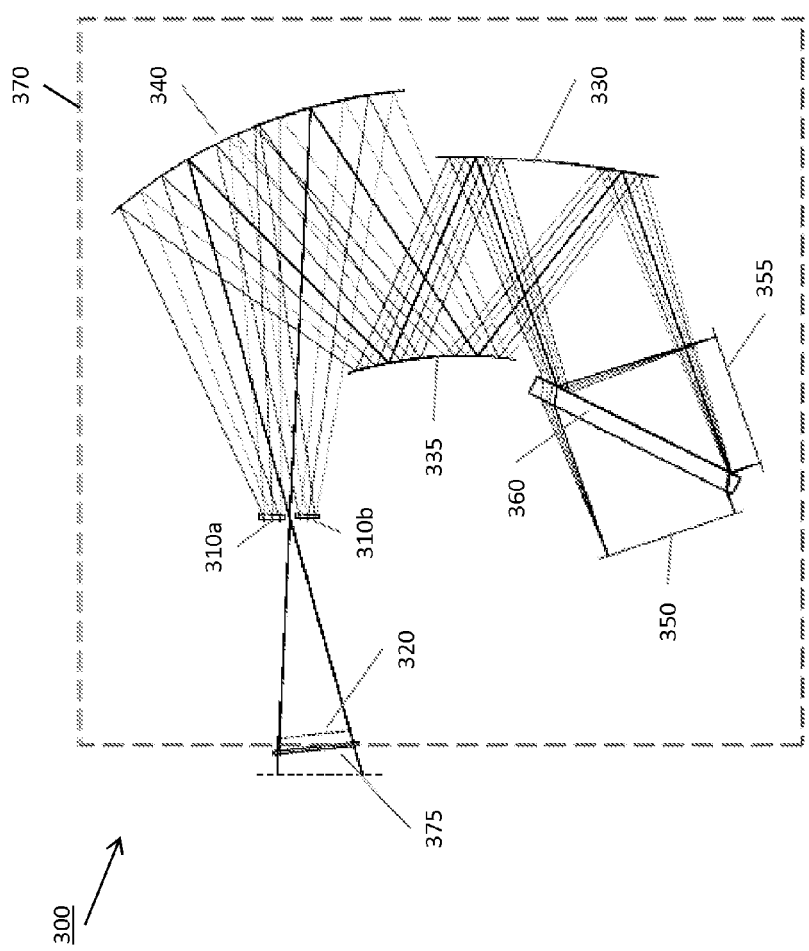
FIG. 3 is a ray trace section of a conventional dual-channel spectrometer using a reflective triplet optical form.

FIG. 3 illustrates an example of a conventional dual-channel imaging spectrometer 300 including two imaging detectors 310a, 310b and based on the reflective triplet optical form. In this example, incident electromagnetic radiation enters the spectrometer via an entrance pupil 320, is collimated by a conventional three-mirror reflective triplet comprised of mirrors 330, 335, 340 on its way to dispersive elements 350, 355, and returns via the reflective triplet to be imaged on a common image plane at which the imaging detectors 310a, 310b are located. A beamsplitter 360 is used to the split the electromagnetic radiation into two spectral channels. In contrast to embodiments of the spectrometer 100 based on the 4MA 170 discussed above, the reflective triplet (comprised of mirrors 330, 335, 340) of the conventional spectrometer 300 is non-reimaged and does not produce an intermediate image plane or reimaged pupil. As a result, for infrared applications, the entire optical train must be cooled within a large cooling chamber 370, as illustrated in FIG. 3. The cooling chamber 370 includes an optically transparent window 375 positioned prior to but substantially close to the entrance pupil 320. Comparison between FIGS. 2 and 3 illustrates one advantage of the spectrometer 100 based on the 4MA optical form, namely the ability to use a far smaller cooling chamber 230 (compared to the chamber 370) with most of the optical components being at ambient temperature. As a result, the cooling time for the spectrometer 100 may be on the order of minutes, rather than hours as is typically the case for the conventional spectrometer 300.

Figure 4A:
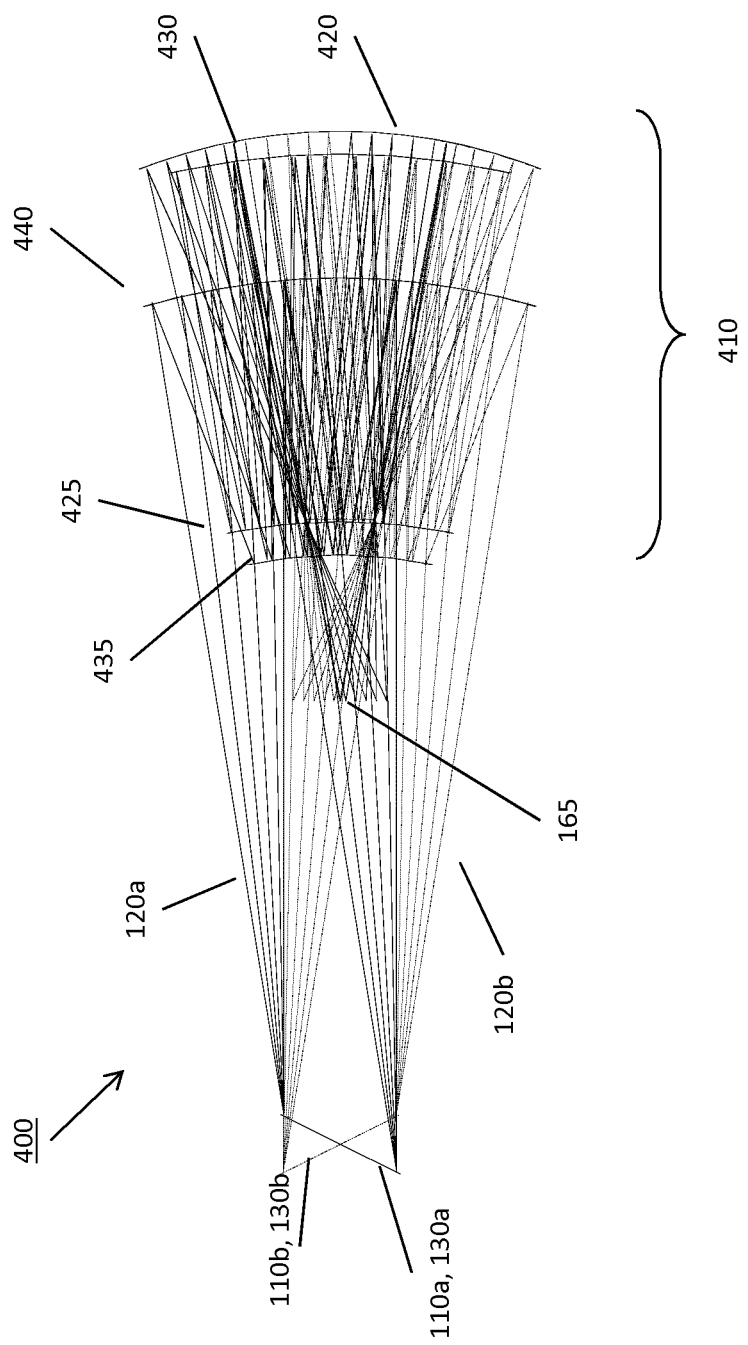
FIG. 4A is a plan view of a ray trace section of one example of a dual-channel double pass spectrometer in the sagittal plane using the five mirror anastigmat optical form according to aspects of the present invention.
Figure 4B:
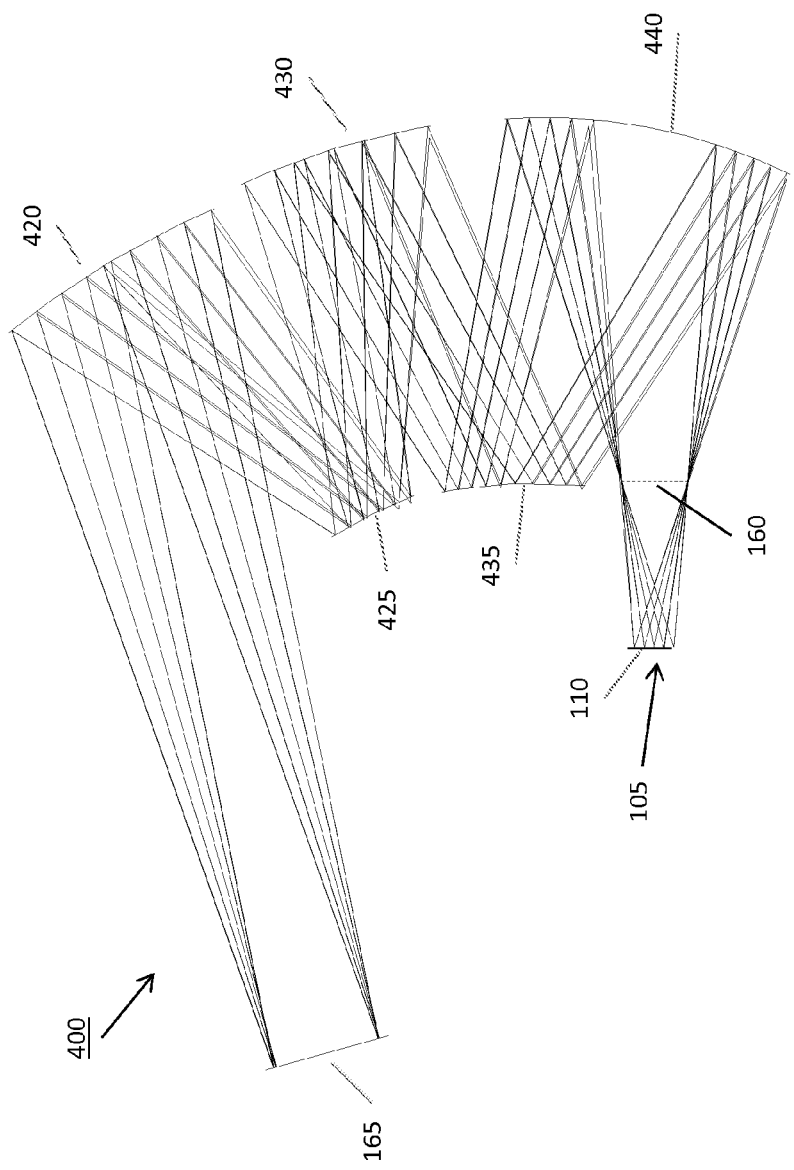
FIG. 4B is a tangential plane view of the ray trace section of FIG. 4A.

According to another embodiment, a multi-channel dispersive imaging spectrometer may be implemented using an all-reflective 5MA optical form in a double-pass configuration. FIGS. 4A and 4B illustrate an example of a dual-channel double-pass spectrometer 400 using the 5MA optical form. In the illustrated example, the spectrometer 400 is dual-channel in the sagittal plane and includes a pair of slits 110a 110b; however those skilled in the art will readily appreciate that the spectrometer could alternatively be dual-channel in the tangential plane. Electromagnetic radiation from a viewed scene is input to the spectrometer 400, as indicated by arrow 105, via the slit(s) 110. In the illustrated example, the spectrometer 400 is a dual-channel spectrometer, and accordingly, the electromagnetic radiation may be split into a first spectral band (channel) 120a and a second spectral band 120b using a beamsplitter 220, as discussed above and as illustrated in FIG. 5, for example. Two imaging detectors 130a and 130b, one for each spectral channel, may be located at image planes substantially co-located with the slits 110a, 110b.

In the illustrated example, the spectrometer optics includes a 5MA 410 comprised of a first mirror 420, a second mirror 425, a third mirror 430, a fourth mirror 435, and a fifth mirror 440 arranged in a double-pass configuration and having an entrance pupil at 165 and a reimaged pupil 160. The first mirror 420 reflects the electromagnetic radiation to and from a real entrance pupil 165. In one example, the first mirror 420 has positive optical power. The second mirror 425 reflects the electromagnetic radiation to and from the first mirror 420. In one example, the second mirror 425 has negative optical power. The third mirror 430 reflects the electromagnetic radiation to and from the second mirror 425. In one example, the third mirror 430 has positive optical power. The fourth mirror 435 reflects the electromagnetic radiation to and from the third mirror 430. In one example, the fourth mirror 435 has negative optical power. The fifth mirror 440 reflects the electromagnetic radiation to and from the fourth mirror 435. In one example, the fifth mirror 440 has positive optical power. The fifth mirror 440 further receives the electromagnetic radiation from the slit(s) 110 and, on the return path, reflects the electromagnetic radiation toward the imaging detectors 130a and 130b. Desirably, the sum of the optical powers of all of the mirrors 420, 425, 430, 435, and 440 is substantially zero. This satisfies the Petzval sum criterion of substantially zero to form a flat image at the image plane(s) at which the imaging detectors 130a, 130b are located.

Figure 5:
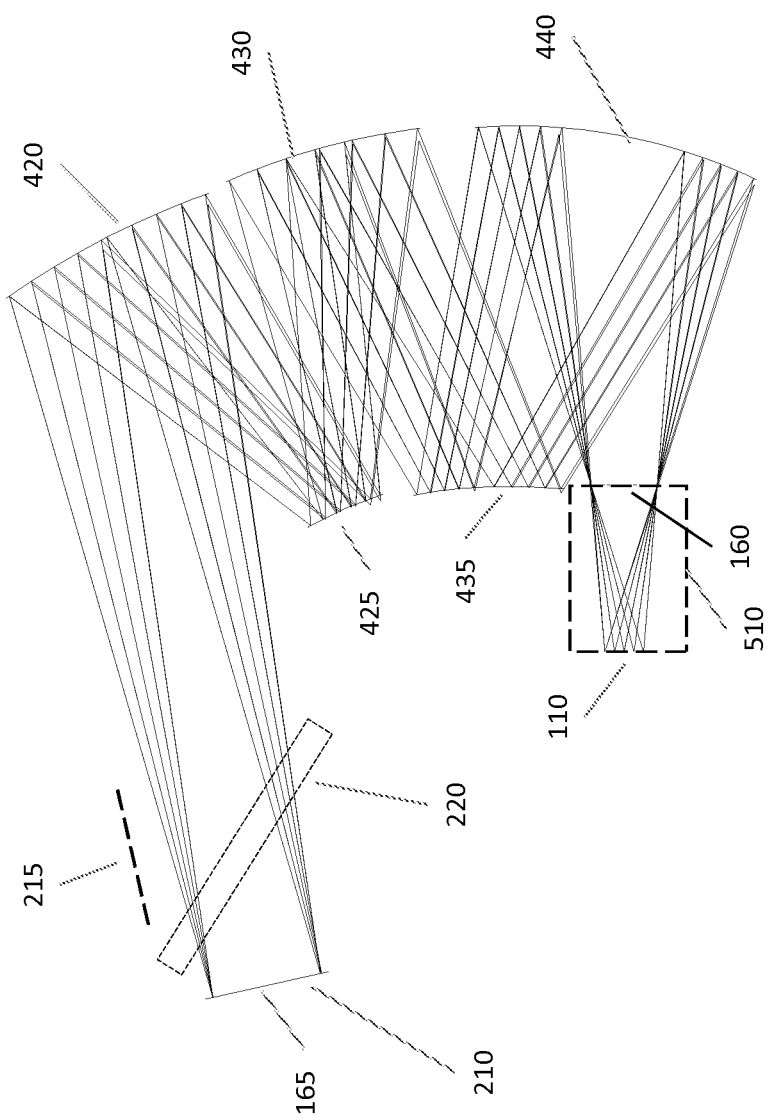
FIG. 5 is a ray trace section of one of example of the spectrometer of FIGS. 4A and 4B according to aspects of the present invention.

The spectrometer 400 further includes a pair of reflective dispersive elements, one for each spectral channel, located at or near the real entrance pupil 165 and which spectrally disperse the electromagnetic radiation and reflect the dispersed radiation back through the 5MA 410 to the imaging detectors 130a, 130b. FIG. 5 illustrates an example of the spectrometer 400 showing first and second dispersive elements 210 and 215, respectively, and a beamsplitter 220 configured to split the electromagnetic radiation into the two spectral bands 120a, 120b and direct each spectral band to the respective dispersive element.

Thus, the 5MA 410 provides all-reflective reimaging optics configured to image a wide field of view onto a flat field, and, like the 4MA 170, is well suited for multi-channel spectrometer applications. In addition, similar to the 4MA 170, the relayed nature of the 5MA, 410 allows for location of the slit(s) 110 and the imaging sensors 130a, 130b inside a cooling chamber, while the optical train can remain at ambient temperature. For example, referring to FIG. 5, a relatively small cooling chamber 510 which houses the imaging detectors 130a, 130b may be positioned between the reimaged pupil 160 and the slit(s) 110. The chamber 510 may be a tactical Dewar or other type of cryo-vac chamber, for example. The 5MA 410, along with the dispersive elements 210, 215 and the beamsplitter 220 are located outside of the cooling chamber 510 and are therefore at ambient temperature. The electromagnetic radiation from the slit(s) 110 to the dispersive elements 210, 215 and back to the imaging detectors 130a, 130b may be entirely confined to the ambient low emissivity mirror surfaces of the 5MA, and thus the imaging detectors 130a, 130b "see" a minimum of thermally emitted background radiation. Comparison between FIGS. 5 and 3 illustrates one advantage of the spectrometer 400 based on the 5MA optical form, namely the ability to use a far smaller cooling chamber 510 (compared to the chamber 370) with most of the optical components being at ambient temperature. As a result, the cooling time for the spectrometer 400 may be on the order of minutes, rather than hours as is typically the case for the conventional spectrometer 300.

In addition, the five mirrors of the 5MA 410 provide additional design choices and degrees of freedom relative to the 4MA 170, and even more so relative to the conventional three-mirror reflective triplet. Accordingly, the 5MA 410 may provide enhanced capability to correct for aberrations and/or distortion, and use of the 5MA 410 for the spectrometer 400 allows for the spectrometer 400 to accommodate larger slit(s) and FPA(s) formats and faster optical speeds. Additionally, use of the all-reflective 5MA 410 preserves all the capabilities of the conventional reflective triplet configuration (e.g., no spectral limitations and multi-channel operation), while allowing the spectrometer optics to be placed outside of the cooling chamber, as discussed above.

Table 1 below provides two design examples of spectrometer configurations using examples of the 5MA 410. Example 1 corresponds to an optical speed of F/2.5, and example 2 corresponds to an optical speed of F/2.0. In each case, the dimensional extent of the 5MA 410 (measured from the upper tip of the first mirror 420 to the lower tip of the fifth mirror 440 in FIG. 4B is approximately 71 cm.

TABLE 1

| Characteristic | Example 1 | Example 2 |
| --- | --- | --- |
| Aperture (grating) | 10.3 cm | 12.8 cm |
| Optical Speed | F/2.5 | F/2.0 |
| Focal Length | 25.75 cm | 25.52 cm |
| Format | 3.7 cm × 8.37 cm | 3.7 cm × 8.37 cm |
| Field of view (FOV) | 8.2 × 18.5 degrees | 8.2 × 18.5 degrees |
| Cavity Pupil | 6.2 cm | 7.9 cm |
| Pupil Magnification | 1.66X | 1.62X |
| Cavity Length | 15.6 cm | 15.7 cm |
| Diffraction limited at | 2.26 μm | 2.85 μm |
| Distortion Average | 4 μm | 7 μm |
| Pupil Error Average | 0.4 mm | 0.5 mm |

Thus, aspects and embodiments provide optical forms for a multi-channel double-pass imaging spectrometer that may enable design and implementation of a compact, high performance spectrometer with numerous advantages. As discussed above, for infrared applications in which cooling of the imaging sensors is highly desirable and typically necessary to achieve acceptable performance, the use of the 4MA or 5MA reimaging optical form allows the spectrometer optics to be maintained at ambient temperature while a relatively small cooling chamber that houses only the imaging sensors, and optionally the slit(s) and/or some small components associated with the imaging sensors (e.g., a filter), can be used to provide the desired cooling. This dramatically reduces the cooling time and energy while maintaining high performance for infrared imaging applications. In addition, the all-reflective 4MA or 5MA optical forms have little to no spectral limitations (unlike optical forms that include refractive elements, which are highly spectrally dependent/variable) and are easily compatible with multi-channel applications. Thus, spectrometers based on the 4MA or 5MA optical forms, as disclosed herein, may provide numerous advantages and improvements over conventional imaging spectrometers based on the reflective triplet, or other non-reimaging and/or refractive optical forms.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multi-channel double-pass imaging spectrometer comprising:
   at least one slit through which incident electromagnetic radiation enters the spectrometer;
   at least one imaging detector positioned at an image plane of the spectrometer, the image plane being co-located with the at least one slit;
   double-pass all-reflective reimaging optics configured to receive the electromagnetic radiation from the at least one slit and to output a collimated beam of the electromagnetic radiation, and further configured to produce a reimaged pupil positioned between the double-pass all-reflective reimaging optics and the image plane;
   a beamsplitter configured to split the collimated beam of the electromagnetic radiation into a first spectral band and a second spectral band;
   a first dispersive element configured to spectrally disperse the first spectral band of the electromagnetic radiation to provide a first dispersed output, the first dispersive element being oriented to direct the first dispersed output through the double-pass all-reflective reimaging optics to the image plane; and
   a second dispersive element configured to spectrally disperse the second spectral band of the electromagnetic radiation to provide a second dispersed output, the second dispersive element being oriented to direct the second dispersed output through the double-pass all-reflective reimaging optics to the image plane.

2. The multi-channel double-pass imaging spectrometer of claim 1 further comprising a cooling chamber positioned between the reimaged pupil and the at least one slit, the at least one imaging detector being located within the cooling chamber.

3. The multi-channel double-pass imaging spectrometer of claim 1, wherein the double-pass all-reflective reimaging optics includes a four-mirror anastigmat.

4. The multi-channel double-pass imaging spectrometer of claim 3, wherein the four-mirror anastigmat includes:
   a primary mirror having a positive optical power;
   a secondary mirror;
   a tertiary mirror having a negative optical power; and
   a quaternary mirror having a positive optical power.

5. The multi-channel double-pass imaging spectrometer of claim 4, wherein the secondary mirror is non-powered.

6. The multi-channel double-pass imaging spectrometer of claim 5, a sum of the optical powers of the primary, secondary, tertiary, and quaternary mirrors is zero.

7. The multi-channel double-pass imaging spectrometer of claim 1 wherein the double-pass all-reflective reimaging optics includes a five-mirror anastigmat.

8. The multi-channel double-pass imaging spectrometer of claim 7, wherein the five-mirror anastigmat includes:
   a first mirror having a positive optical power;
   a second mirror having a negative optical power;
   a third mirror having a positive optical power;
   a fourth mirror having a negative optical power; and
   a fifth mirror having a positive optical power.

9. The multi-channel double-pass imaging spectrometer 8, wherein a sum of the optical powers of the first, second, third, fourth, and fifth mirrors is zero.

10. The multi-channel double-pass imaging spectrometer of claim 1 wherein the first and second dispersive elements are prisms.

11. The multi-channel double-pass imaging spectrometer of claim 1 wherein the first and second dispersive elements are diffraction gratings.

12. The multi-channel double-pass imaging spectrometer of claim 1 wherein the at least one imaging detector includes a focal plane array sensor.

13. The multi-channel double-pass imaging spectrometer of claim 1 wherein the double-pass all-reflective reimaging optics further include a real entrance pupil, and are configured to output the collimated beam of the electromagnetic radiation at the real entrance pupil.

14. The multi-channel double-pass imaging spectrometer of claim 13, wherein the first and second dispersive elements are located proximate the real entrance pupil.

15. A double-pass infrared imaging spectrometer comprising:
   at least one slit through which incident infrared electromagnetic radiation enters the spectrometer;
   at least one imaging detector positioned at an image plane of the spectrometer, the image plane being co-located with the at least one slit;
   double-pass all-reflective reimaging optics configured to receive the infrared electromagnetic radiation from the at least one slit and to output a collimated beam of the infrared electromagnetic radiation at a real entrance pupil, and further configured to produce a reimaged pupil positioned between the double-pass all-reflective reimaging optics and the image plane;
   at least one dispersive element positioned proximate the real entrance pupil and configured to spectrally disperse the infrared electromagnetic radiation to provide a dispersed output, the dispersive element being oriented to direct the dispersed output through the double-pass all-reflective reimaging optics to the image plane; and
   a cooling chamber positioned between the reimaged pupil and the at least one slit, the at least one imaging detector being positioned within the cooling chamber, and the double-pass all-reflective reimaging optics being positioned outside the cooling chamber.

16. The double-pass infrared imaging spectrometer of claim 15, wherein the double-pass all-reflective reimaging optics includes a four-mirror anastigmat.

17. The double-pass infrared imaging spectrometer of claim 15, wherein the double-pass all-reflective reimaging optics includes a five-mirror anastigmat.

18. The double-pass infrared imaging spectrometer of claim 15, wherein the spectrometer is a dual-channel spectrometer and further comprising a beamsplitter configured to separate the collimated beam of the infrared electromagnetic radiation into a first spectral band and a second spectral band; and
   wherein the at least one dispersive element includes:
      a first dispersive element configured to spectrally disperse the first spectral band of the electromagnetic radiation to provide a first dispersed output, the first dispersive element being oriented to direct the first dispersed output through the double-pass all-reflective reimaging optics to the image plane; and
      a second dispersive element configured to spectrally disperse the second spectral band of the electromagnetic radiation to provide a second dispersed output, the second dispersive element being oriented to direct the second dispersed output through the double-pass all-reflective reimaging optics to the image plane.

* * * * *